United States Patent [19]

Johnson et al.

[11] Patent Number: 4,495,763

[45] Date of Patent: Jan. 29, 1985

[54] DUAL-THRUST NOZZLE APPARATUS FOR ROCKETS

[75] Inventors: Dell A. Johnson, Nibley; Christopher W. Bolieau, Brigham City, both of Utah

[73] Assignee: Thiokol Corporation, Chicago, Ill.

[21] Appl. No.: 476,956

[22] Filed: Mar. 21, 1983

[51] Int. Cl.³ .............................................. F02K 1/18
[52] U.S. Cl. ...................................... 60/242; 60/253;
60/271; 239/265.15; 239/265.19
[58] Field of Search ................... 60/235, 242, 253, 256,
60/271, 39.47; 239/265.11, 265.15, 265.19

[56] References Cited

U.S. PATENT DOCUMENTS

| | | | |
|---|---|---|---|
| 3,011,309 | 12/1961 | Carter | 60/242 X |
| 3,608,312 | 9/1971 | Miltenberger | 60/271 X |
| 3,914,935 | 10/1975 | Burkes, Jr. | 60/242 X |
| 3,943,708 | 3/1976 | Panella | 60/242 |
| 4,023,497 | 5/1977 | Morris et al. | 60/256 X |
| 4,109,867 | 8/1978 | Ebeling, Jr. | 60/242 X |

FOREIGN PATENT DOCUMENTS 1181494 11/1964 Fed. Rep. of Germany ........ 60/256

*Primary Examiner*—Louis J. Casaregola
*Assistant Examiner*—Donald E. Stout
*Attorney, Agent, or Firm*—Gerald K. White

[57] ABSTRACT

A housing is mounted to the convergent portion of a convergent-divergent thrust nozzle for rockets via legs that space the housing from the nozzle so that it will not obstruct the flow of propulsive gases therethrough. A cavity in the housing holds a secondary nozzle member having a throat that is smaller in diameter than that of the primary nozzle. An electrically actuated, gas producing device in the housing forces the secondary nozzle member out of its cavity on command and seats it against the convergent portion of the primary nozzle. Simultaneously, ports in the housing are opened to the propulsive gases of the rocket, this forces a plug, that seals the secondary nozzle during storage, out through the primary nozzle.

Some embodiments of the invention also provide for attaching a rocket igniter to the housing, so that the electrical wiring to the igniter can pass through the same ducts and holes as the wiring to the gas producing device for deploying the secondary nozzle.

20 Claims, 4 Drawing Figures

DUAL-THRUST NOZZLE APPARATUS FOR ROCKETS

BACKGROUND OF THE INVENTION

1. Field of the Invention

This invention relates broadly to thrust nozzles for rockets. More specifically, it relates to nozzles capable of varying the cross sectional area of the nozzle throat to help control the magnitude of thrust.

2. Description of the Prior Art

For several reasons, it is desirable to have a dual-thrust capability in certain missiles: (1) On ignition, the missile weighs more than it does after some of the propellant has been burned; and, hence, more thrust is required for lift-off; (2) It requires more energy to overcome the inertia of a rocket in repose and to accelerate it to cruising velocity than it does to maintain cruising velocity; and (3) A missile being launched from an aircraft must clear the launching device as quickly as possible to avoid damage to the aircraft. Hence, the initial thrust of such a rocket must be considerably greater than the thrust required for sustained flight to a distant target.

One means of accomplishing this dual-thrust objective is to design the nozzle throat so that it becomes smaller after its boost phase has been completed. This has the advantages of causing the remaining propellant to burn under a higher pressure, and thus more efficiently; and of providing a much larger nozzle expansion ratio, which uses the thrust of the exhaust plume more effectively in the high-altitude portion of the missile's flight.

Rocket and jet propulsion nozzles that are designed for this purpose are known in the art. For example, U.S. Pat. No. 2,880,576 to Kappus shows a jet propulsion nozzle having radially movable throat elements for varying the diameter of the nozzle throat. U.S. Pat. No. 3,230,704 to Lovingham shows a valve member that moves relative to a thrust nozzle throat; and U.S. Pat. No. 3,182,447 to Bell shows a secondary nozzle member that slides relative to a primary thrust nozzle in response to gases from external sources.

These prior art devices are characterized by being heavy and complex. They depend on precision, moving parts, and require that the entire reaction motor or major parts thereof be specially designed to incorporate their respective inventions. Also, except for the patent to Bell, they are intended primarily for use with liquid propellant systems and are not suitable for use in the more severe environments of high temperature and erosiveness inside solid propellant rockets. U.S. Pat. No. 3,888,419 shows a spike nozzle having a variable throat.

SUMMARY OF THE INVENTION

The present invention is intended to overcome these difficulties in the prior art. Hence, objects of the invention are to provide an improved dual throat, thrust nozzle for rocket motors that is light in weight, that has a minimum of precision, moving parts, a nozzle that can withstand the severe environment within an operating, solid propellant rocket, and that can incorporate a conventional rocket nozzle in its design.

Another object of the invention is to provide such an apparatus wherein no moving parts are exposed to the hot, propulsive gases of a rocket.

Another object of some embodiments of the invention is to provide a mount for the rocket igniter that will greatly simplify and shorten the electrical wiring therefor, thereby eliminating weight.

The invention has a housing mounted to the forward, convergent surface of a conventional, convergent-divergent thrust nozzle by means of legs to insure the free flow of propulsive gases through the primary nozzle. A cavity in the housing holds a secondary nozzle member having a smaller throat than that of the primary nozzle to which the housing is mounted. The housing contains a gas producing device that, on signal, forces the secondary nozzle aftwardly in the cavity to be seated against the convergent portion of the primary nozzle. This movement also opens ports in the housing, through which the propulsive gases of the rocket flow to be discharged through the secondary nozzle.

A plug that seals the secondary nozzle during storage is forced out through the primary nozzle when the secondary nozzle member is opened to the propulsive gases of the rocket.

Other features and advantages of the invention will be noted as the following, detailed description is read with reference to the accompanying drawings, wherein the same parts are designated with the same numbers throughout the disclosure.

DESCRIPTION OF THE PREFERRED EMBODIMENTS

Figure 1:
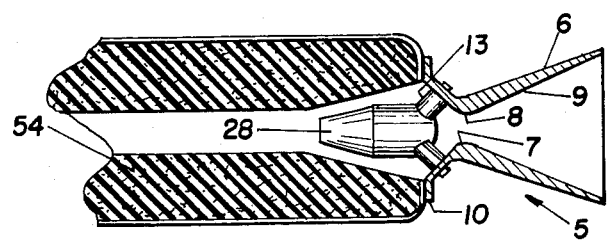
FIG. 1 is a partial, longitudinal section of a solid propellant rocket, showing the invention installed therein.

As shown in FIG. 1, the invention is a dual thrust nozzle 5. The primary nozzle member 6 thereof is a conventional convergent-divergent nozzle having a convergent portion 7, a throat 8, and a divergent portion 9. It is capable of being attached to a rocket case, by means of a flange 10 and, in FIG. 1, is shown in null position in which the longitudinal axis thereof is in alignment with the longitudinal axis of the rocket.

An outer housing 11, having a cylindrical cavity 12 therein, is attached to the convergent portion 7 of the primary nozzle member 6 by three legs 13. Three large screws 14 that pass through holes 15 in the convergent portion 7 of the nozzle member 6 and into a threaded hole 16 in each leg 13 fix the housing 11 rigidly to the primary nozzle member 6.

A secondary nozzle member 17, having a convergent portion 18, a throat 19, and a divergent portion 20, is fixed inside an inner cylindrical housing 21 that fits inside the outer housing 11. A cup-shaped piston member 22, having external threads is fitted into an internally threaded hole 23 in the forward portion of the inner housing 21. A central, cylindrical boss 24 on the interior of the outer housing 11 fits into the piston 22. An elastomeric ring 25, seated in an annular groove in the boss 24 provides a gastight seal between the boss 24 and the piston 22. A plug 26, having the shape of a conic frustum, seals the aft end of the secondary nozzle member 17 with the aid of an elastomeric ring 27 seated in an annular groove in the periphery of the plug 26. The aft surface of the plug 26, as well as that of the inner housing 21, is covered with a layer of thermal insulation 28. A long shaft 29 is fixed at its aft end to the center of the plug 26 and at its forward end are external threads for engaging a threaded hole 30 in the piston 22. A reduced diameter zone 31 on the shaft 29 provides a failure point on the shaft 29. The inner cylindrical housing 21 is in a gastight relationship with the cavity 12 of the outer housing 11 because of two elastomeric rings 32 seated in annular grooves in the surface of the inner housing 21. A shear pin 33 that fits into aligned holes in the two housings 11 and 21 retains the inner housing 21 in the cylindrical cavity 12 of the outer housing 11.

The inner housing 21 has three flow ports 34 in its sides, spaced approximately 120° apart. They are located between the convergent portion 18 of the secondary nozzle 17 and the piston 22. A corresponding set of three openings 35 is located in the walls of the outer housing 11, but are spaced aftwardly of the flow ports 34, so that they are not aligned therewith.

The forward end of the outer housing 11 contains a deep cavity 36 surrounded by a cylindrical, externally threaded flange 37. A rocket igniter 38 having a cylindrical case 39 with a closed aft end 40, has a cavity 41 in the aft end 40, similar to the cavity 36, surrounded by a short, outwardly-extending flange 42. An internally threaded coupler 43, having the form of a hollow cylinder with a short, inwardly-extending flange 44, joins the outer housing 11 to the igniter case 39 by engaging the threads of the flange 37 and confining the flange 42 of the igniter case 39 between the flanges 37 and 44 of the outer housing 11 and coupler 43, respectively.

When this is done, the cavities 36 and 41 of the outer housing 11 and igniter case 39 combine to form a single, hollow space 45 that houses an electric initiator 46 that extends through a hole 47 in the igniter case 39 and into communication with pyrotechnic pellets 48. The pellets 48 are capable of being ignited by the electric initiator 46; and, in turn, they ignite the propellant 49 of the igniter 38 through perforations 50 in a partition 51 in the igniter 38. A forward end closure 52 has a central aperture 53 that functions as a nozzle to accelerate hot gases from the igniter 38 onto the solid propellant 54 of a rocket (FIG. 1).

The hollow space 45 also houses a pressure cartridge 55 that engages a threaded hole 56 centrally located in the outer housing 11. This hole 56 extends through the boss 24, so that hot gases from the cartridge 55 can impinge directly on the piston 22.

Figure 2:
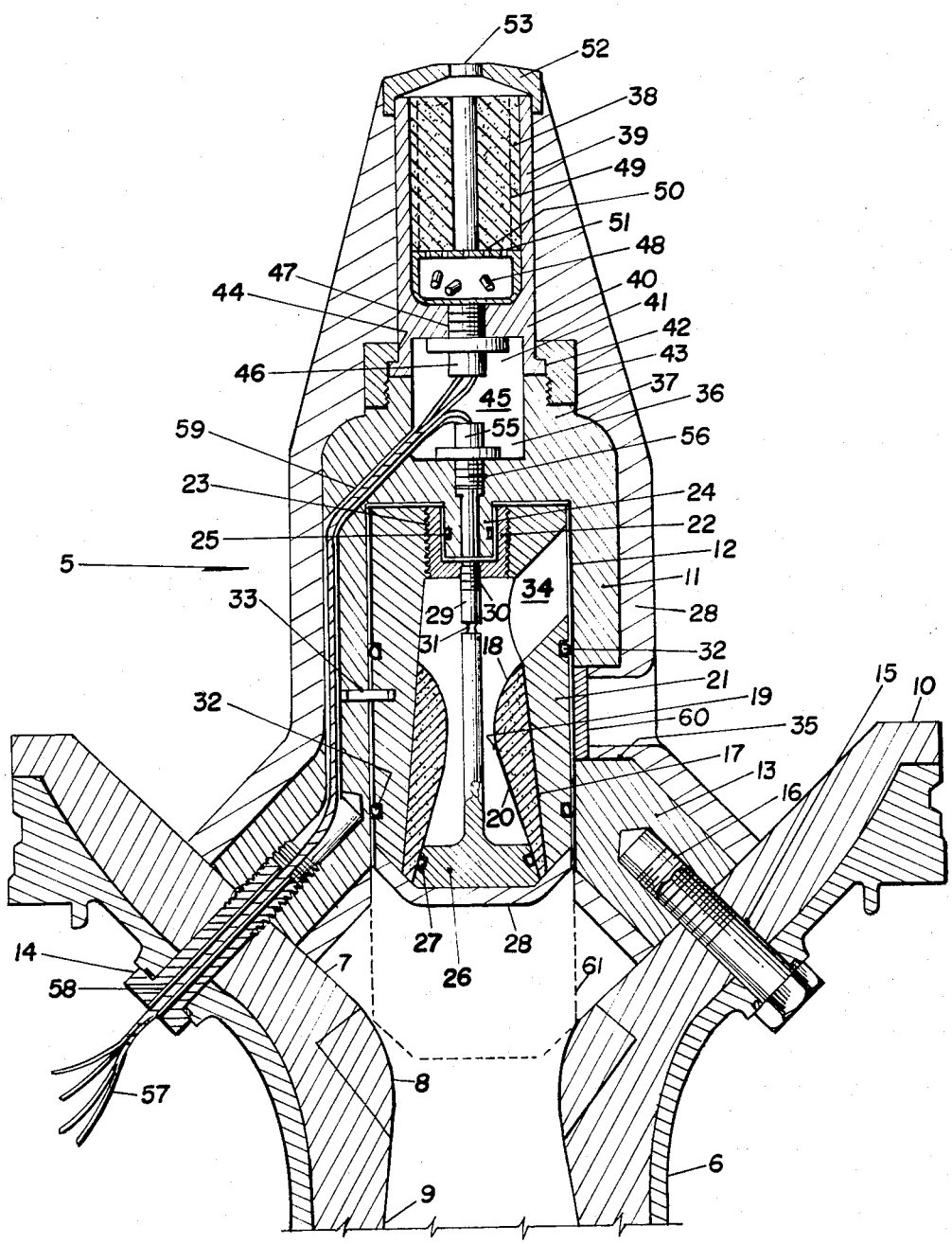
FIG. 2 is a longitudinal section of the invention, considerably enlarged and rotated 90° relative to FIG. 1.

Electrical wiring 57 for firing the initiator 46 and the pressure cartridge 55 is ducted through a hole 58 in one of the large screws 14 and continues through a duct 59 in the wall of the outer housing 11. As shown in FIG. 2, at least a portion of the passage 59 can be in the form of a groove in the outer housing, to facilitate manufacture. The space in the ducts surrounding the wires is filled with any of the high temperature sealants that are known in the art.

The apparatus described is protected from the high temperatures and erosive gases within the operating rocket motor by a thick coat of the thermal insulation 28. Although a number of materials could be used for this insulation 28, a preferred material is a phenolic resin filled with chopped carbon cloth. This insulation encases the outer housing 11, its legs 13, the coupler 43, and the igniter 38. The only portion of the described apparatus that is not covered by the insulation 28 is the forward closure 52 of the igniter 38. Special plugs 60 of the same insulation material are fitted into the openings 35 in the outer housing 11.

The first event in operation of the described apparatus is firing of the rocket igniter 38. This igniter 38 is of a type well known in the art of rocket technology. An electrical impulse is conducted to the initiator 46 via the wires 57. This initiator 46 can be a commercially available squib of the type in which a resistance wire is in contact with a highly combustible substance, such as powdered boron and potassium nitrate. When this ignites, hot gases ignite the pyrotechnic pellets 48, which in turn ignite the propellant 49 of the igniter 38. The resulting hot gases are discharged through the nozzle aperture 53 of the igniter 38 and onto the solid propellant 54 of the rocket. The propulsive gases of the rocket are discharged through the primary nozzle member 6 during this initial or booster phase of operation.

After the booster phase of operation of the rocket has been completed, an electrical signal from a pressure sensor or other device (not shown), fires the pressure cartridge 55. This cartridge 55 is similar to the electric initiator 46; and, when fired, it discharges gases through the hole or duct 56 so that they impinge on the piston 22, forcing it aftwardly. This movement breaks the shear pin 33 and seats the secondary nozzle member 17 against the convergent portion 7 of the primary nozzle member 6, as shown by broken lines 61. The cylindrical cavity 12 of the outer housing is perfectly aligned with the axis of the rocket, so that it functions as a guide to maintain the secondary nozzle 17 in perfect alignment with the primary nozzle member 6.

When the secondary nozzle member 17 becomes seated against the primary nozzle, the flow ports 34 in the inner housing 21 are aligned with the openings 35 of the outer housing 11. This allows the propulsive gases within the rocket motor to force the insulation plugs 60 inwardly and to fill the inner housing with the gases of the rocket. These gases then exert pressure on the plug 26, breaking the shaft 29 at its reduced diameter zone 31 and forcing the plug 26 to be expelled through the throat 8 of the primary nozzle member 6. This also shears off the layer of insulation 28 that covers the aft surface of the plug 26. The insulation plugs 60 are expelled through the secondary nozzle 17.

The propulsive gases of the rocket, being discharged through the secondary nozzle, bear against the convergent surface 18 thereof to maintain the secondary nozzle member 17 firmly in its position relative to the primary nozzle member 6. In this manner, the propulsive gases of the rocket are forced to be discharged through the smaller throat 19 of the secondary nozzle 17 for the decreased thrust that can power the flight of the missile throughout its sustained or cruising phase of operation, while still burning its propellant at an efficient pressure level.

Figure 3:
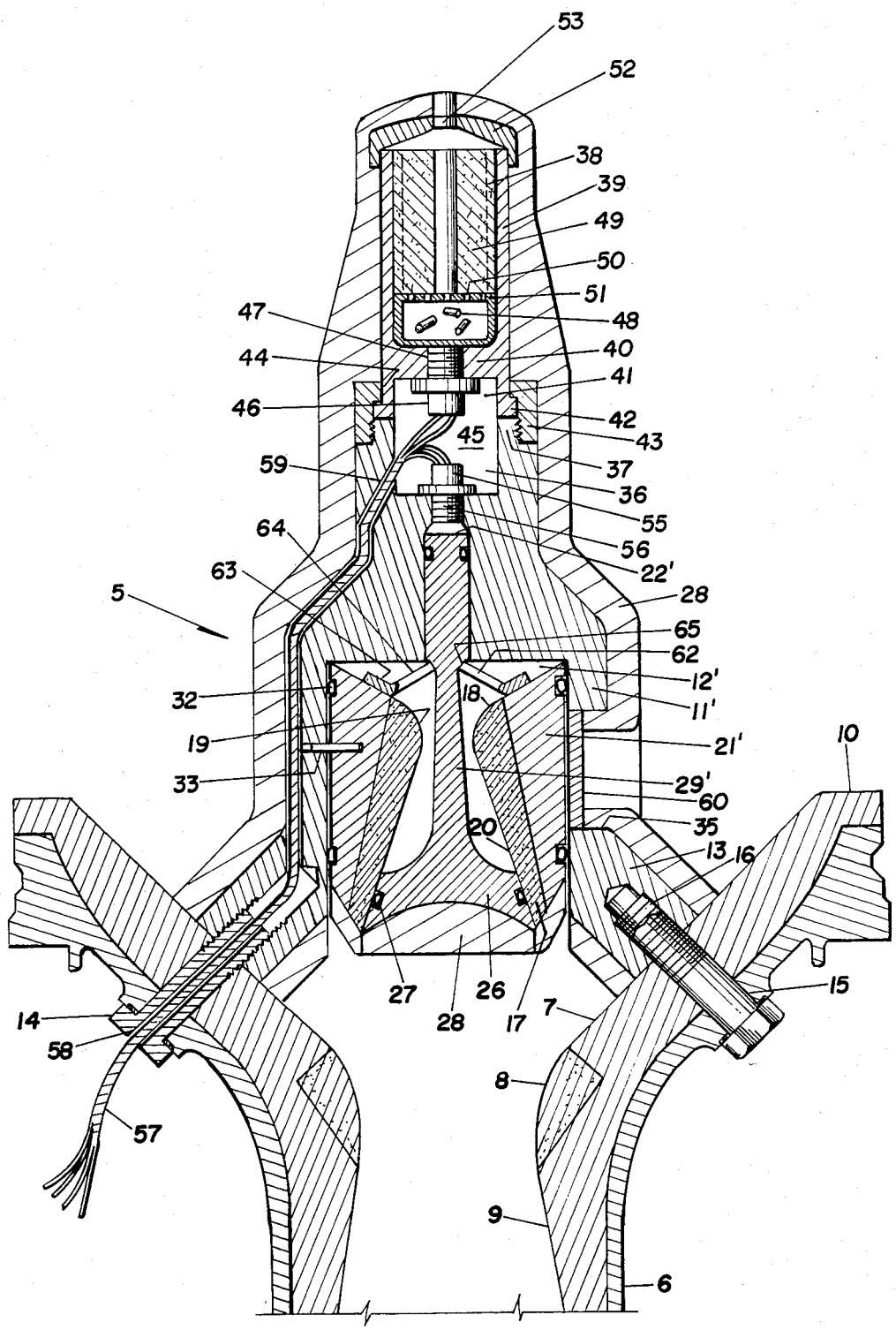
FIG. 3 is similar to FIG. 2 but shows a second embodiment of the invention.

The embodiment of the invention shown in FIG. 3 is identical in structure and function to that described above, except for modifications in the cavity 12' of the outer housing 11', the structure of the inner housing 21' for the sustained thrust phase of rocket operation, in the means for retaining and expelling the plug 26, and for seating the secondary nozzle member 17.

In this embodiment, the portion of the inner housing 21' forward of the convergent portion 18 of the secondary nozzle member 17 is eliminated; so that the inner housing 21' becomes the outer portion of the secondary nozzle member 17. This eliminates the flow ports 34 and the piston 22. Also, in this embodiment, the shaft 29' of the plug 26 extends into the duct 56 to provide a piston 22' against which gases from the pressure cartridge 55 can bear to move the shaft 29' aftwardly. The plug 26 is retained in the secondary nozzle member 17 by a spider support 62 comprising a ring 63 and inwardly-extending prongs 64, which bear against a shoulder 65 on the shaft 29' formed by a reduced-diameter portion of the shaft 29'.

When the electric pressure cartridge 55 is fired, gases are discharged into the duct 56, so that they bear against the piston 22' to force the entire asembly, comprising the inner housing 21', the secondary nozzle member 17, the plug and shaft, 26 and 29', and the spider support 62, aftwardly. When the aft surfaces of the secondary nozzle member 17 are seated against the convergent surface 7 of the primary nozzle, the flow ports 35 in the outer housing are unobstructed by the inner housing 21', so that the insulation plugs 60 are forced inwardly by the propulsive gases of the rocket. This clears the ports 35, permitting the gases to enter the secondary nozzle member 17 and force the plug 26, together with its shaft 29' and the insulation 28 outwardly through the primary nozzle member 6. When this happens, the prongs 64 of the spider support 62 are reversed into an aftwardly extending position; so that they release the shoulder 65 of the shaft 29', permitting the shaft 29' to slide through them. As in the previous embodiment, the shear pin 33 is broken to permit this aftward displacement of the secondary nozzle member 17. The secondary nozzle member 17 then functions as described for the embodiment of FIG. 1.

Figure 4:
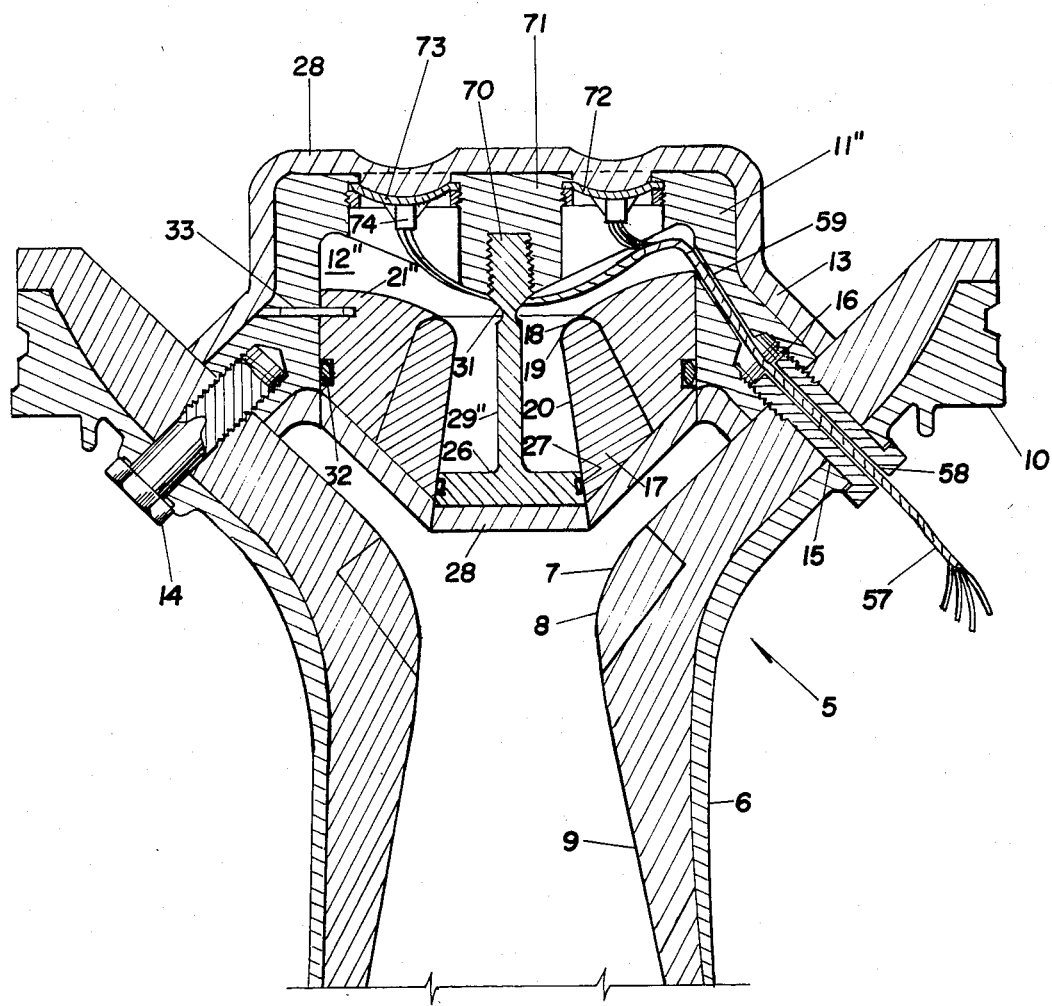
FIG. 4 is also similar to FIG. 2, but shows a third embodiment of the invention.

The embodiment of the invention shown in FIG. 4 is considerably shortened relative to the previously described embodiments of the invention. The igniter 38 and the provision for its attachment 42 are eliminated from this device, as are the pressure cartridge 55 and the piston 22. Otherwise, this embodiment of the invention is structurally similar to those described. It has a cylindrical housing 11" having a cylindrical cavity 12" opening the aft end thereof. The housing 11" is spaced away from the convergent surface 7 of the primary nozzle member 6 by three legs 13, which are fastened to the primary nozzle member 6 by screws 14, as described for the previous embodiments.

A plug 26, similar to that shown in FIG. 1, has a shaft 29" that is fastened into a threaded hole 70 in a boss 71 that extends aftwardly from the forward end of the housing 11". The shaft 29" has a reduced diameter zone 31 near its attachment to the boss 71. An elastomeric ring 27 provides a gastight seal between the plug 26 and the secondary nozzle member 17. A second elastomeric ring 32 provides a gastight seal between the outer portion 21" of the secondary nozzle member 17 and the outer housing 11".

The forward end of the housing 11" has two openings 72 that are closed by electrically operated burst diaphragms 73. Each diaphragm 73 is equipped with a small explosive charge 74 that can be electrically detonated by an electrical impulse via the wires 57. These wires are threaded through a hole 58 in one of the screws 14 and through a passage 59 in the wall of the outer housing 11". The outer surface of the housing 11", the legs 13, and the plug 26 are all covered with a layer of thermal insulation 28.

After the boost phase of the rocket has been terminated, the explosive charges 74 on the burst diaphragms 73 are detonated. This removes the diaphragms 73 and insulation 28 from the openings 72 of the housing 11", allowing the pressurized gases of the rocket to enter the interior of the secondary nozzle member 17. This applies force in an aftwardly direction on secondary nozzle member 17, breaking the shear pin 33 and the reduced diameter zone 31 of the shaft 29". This permits the plug 26 and the layer of insulation 28 that covers it to be expelled through the primary nozzle member 6, and the secondary nozzle member 17 to be seated on the convergent surface 7 of the primary nozzle member 6. Pressure from the propulsive gases thereafter maintains the secondary nozzle member 17 in this position during the sustained phase of powered flight of the rocket.

The invention claimed is:

1. Apparatus for imparting dual-thrust capability to a convergent-divergent primary thrust nozzle for rockets, having a throat, comprising:
   a housing having a cavity therein;
   means for mounting the housing upstream of said nozzle throat, so that the cavity opens to the aft of the housing, and so that the housing is spaced away from the convergent portion of the primary nozzle to avoid obstructing propulsive gases that must pass through the nozzle;
   a coat of thermal insulation covering and encasing the housing and the means for mounting the housing for the protection thereof from the high temperatures and erosiveness of the propulsive gases;
   a secondary convergent-divergent nozzle member installed for aftward movement in the cavity of the housing and having a throat that is smaller in diameter than that of said primary nozzle, the aft end of the secondary nozzle member being sealed and covered by a portion of the coat of thermal insulation;
   means for temporarily retaining the secondary nozzle in said cavity;
   means for moving the secondary nozzle member aftwardly at a desired moment, so that it becomes seated against the convergent portion of the primary nozzle in axial alignment therewith; and
   means for automatically opening the secondary nozzle member to propulsive gases of the rocket and for opening the aft end of the secondary nozzle member and for removing therefrom the said portion of the coat of thermal insulation when the secondary nozzle member is seated against the convergent portion of the primary nozzle for discharge of the propulsive gases through the secondary nozzle.

2. The apparatus of claim 1 wherein the means for temporarily retaining the secondary nozzle in the cavity of the housing is a shear pin that extends into adjacent, aligned holes in the secondary nozzle member and in the housing.

3. The apparatus of claim 1 wherein the means for mounting the housing to the convergent portion of the primary nozzle comprises at least one leg, fixed to the housing and being attachable to the primary nozzle.

4. The apparatus of claim 3 wherein the means for mounting the housing to the convergent portion of the primary nozzle comprises three legs, fixed to the housing about 120° apart and fastened to the primary nozzle with screws that extend through holes in the primary nozzle and into threaded holes in the legs.

5. The apparatus of claim 1 wherein the means for moving the secondary nozzle member aftwardly into seated alignment with the primary nozzle comprises;
   a piston attached to the secondary nozzle member;
   an electrically ignitable propellant charge positioned adjacent the piston on the forward side thereof, so that, when ignited, gases from said propellant charge will force the piston aftwardly; and
   means for guiding the secondary nozzle member into axial alignment with the primary nozzle as the secondary nozzle member is forced aftwardly by gases from the propellant.

6. The apparatus of claim 5 wherein the means for guiding the secondary nozzle member into axial alignment with the primary nozzle comprises:
   cylindrical walls of the housing cavity, parallel to and concentric with the axis of the primary nozzle in its null position; and
   a cylindrical outer surface of said secondary nozzle member that fits, for sliding relationship, into the cavity.

7. The apparatus of claim 5 wherein the electrically ignitable propellant charge includes an electric squib adjacent said propellant for ignition thereof; and electric conductors connected to the squib and extending through ducts in said housing.

8. The apparatus of claim 7 wherein the means for mounting the housing to the convergent portion of the primary nozzle comprises three legs fixed to the housing about 120° apart; and screws that pass through holes in the primary nozzle to engage threaded holes in said legs; and wherein the electrical conductors connected to the electric squib pass through the ducts in the housing and through a hole in one of said screws.

9. The apparatus of claim 1 further including an inner housing that, at least laterally, surrounds said secondary nozzle member is fixed thereto, and wherein the means for opening the secondary nozzle to the propulsive gases of the rocket comprises: structure forming at least one opening in the side of the outer housing, said opening being positioned so that it is normally blocked by the inner housing; and wherein the portion of said inner housing forward of the secondary nozzle member is formed so that, when the secondary nozzle member is moved aftwardly to seat against the convergent portion of the primary nozzle, said opening in the outer housing becomes unobstructed, permitting gases of the rocket to flow into the secondary nozzle member.

10. The apparatus of claim 1 including a sealing plug that fits into the aft portion of the secondary nozzle member to protect said member during the boost burn; means for retaining the plug in the secondary nozzle member; and means for releasing the plug when desired.

11. The apparatus of claim 10 wherein the means for retaining the plug is a shaft operatively attached at one end to the forward portion of the secondary nozzle and at its other end to the plug.

12. The apparatus of claim 11 wherein the means for releasing the plug is reduced diameter zone on the shaft that can be broken by pressure of propulsive gases on the plug when the gases enter the secondary nozzle member.

13. The apparatus of claim 10 wherein the means for retaining the plug comprises: a shaft fixed at one end to the plug, a piston at its other end; a shoulder on the shaft, intermediate the ends thereof, having a flat, annular surface on the aft side thereof; a spider support having a ring that rests on the forward surface of the secondary nozzle member and radial prongs fixed to the ring that extend inwardly and forwardly therefrom to engage said shoulder and retain the plug in the secondary nozzle member.

14. The apparatus of claim 13 wherein the means for releasing the plug comprises an electrically ignitable propellant charge adjacent said piston and forward thereof, whereby ignition of the propellant charge can force the shaft aftwardly causing the prongs of the spider support to be bent aftwardly to permit the shoulder and said shaft to slide therethrough.

15. The apparatus of claim 1 further including a layer of thermal insulation on all external surfaces thereof.

16. The apparatus of claim 15 wherein said thermal insulation comprises a cured phenolic resin filled with chopped, carbon cloth.

17. The apparatus of claim 1 further including means for mounting a rocket igniter on the forward portion of said housing.

18. The apparatus of claim 17 wherein the means for mounting the rocket igniter comprises: an externally threaded, cylindrical flange fixed to the forward end of the housing; an internally threaded, coupling ring having an inwardly-extending flange on one end thereof, capable of engaging the threads of the cylindrical flange, whereby a radial, outwardly-extending flange on one end of a rocket igniter can be confined between the inwardly-extending flange of the coupling ring and the outer end of the cylindrical flange.

19. The apparatus of claim 1 wherein the means for opening the secondary nozzle member to propulsive gases of a rocket and the means for moving the secondary nozzle member aftwardly comprise: at least one diaphragm that blocks an opening in the housing forward of the secondary nozzle member; and means for breaking the diaphragm to clear said opening for passage therethrough a propulsive gases when the rocket has completed its booster phase of operation.

20. The apparatus of claim 19 wherein the means for breaking the diaphragm is an electrically-fired explosive charge attached to the diaphragm.

* * * * *